US006855224B2

(12) United States Patent
Wendler

(10) Patent No.: US 6,855,224 B2
(45) Date of Patent: Feb. 15, 2005

(54) PRESSURE SENSITIVE COMPOSITE FOR DECORATING SURFACES OF FRUITS AND VEGETABLES AND USE THEREOF

(75) Inventor: Eric Wendler, Mt. Airy, MD (US)

(73) Assignee: The Creative Carving Company, Mt. Airy, MD (US)

( * ) Notice: Subject to any disclaimer, the term of this patent is extended or adjusted under 35 U.S.C. 154(b) by 0 days.

(21) Appl. No.: 10/166,374

(22) Filed: Jun. 11, 2002

(65) Prior Publication Data

US 2003/0228435 A1 Dec. 11, 2003

(51) Int. Cl.[7] .................................................. B32B 31/18
(52) U.S. Cl. ........................................ 156/250; 156/249
(58) Field of Search ................................ 156/247, 249, 156/267, 253, 277; 206/575

(56) References Cited

U.S. PATENT DOCUMENTS 3,944,455 A * 3/1976 French ........................ 156/361
4,547,001 A * 10/1985 Stitt ............................ 283/81
4,828,114 A * 5/1989 Bardeen ...................... 206/575
5,162,138 A * 11/1992 Caflisch et al. ............... 428/17
5,484,495 A * 1/1996 Moore ......................... 156/62
5,897,797 A 4/1999 Drouillard et al.
6,055,738 A 5/2000 Bardeen et al.
6,093,446 A 7/2000 Bardeen
6,267,036 B1 * 7/2001 Lani ............................ 83/660
6,733,825 B1 * 5/2004 Wendler ...................... 427/181
2002/0085369 A1 * 7/2002 Kramer et al. ................ 362/84

OTHER PUBLICATIONS

Copley News Service, "Real cut–ups," Aug. 24, 2001, p. 1.*
HP. Pumpkin carving templates. Jun. 19, 2004, [online], [retrieved on Jun. 28, 2004]. Retrieved from the Internet <URL: http:/h71036.www7.hp.com/hho/cache/377–0–0–225–121.aspx.>.*

* cited by examiner

*Primary Examiner*—Melvin C. Mayes

(57) ABSTRACT

The present invention provides a product, a method and a kit for decorating the surface of fruits and vegetables that have an area adapted to display a design. The product comprises a sheet of materials with two components: component 1 is a sheet of material capable of acting as a release liner for component 2; component 2 is a sheet of material capable of acting as the surface for a pattern formed thereon and capable of adhering to the surface of fruits and vegetables. The method comprises steps in which: component 1 is removed from component 2, component 2 containing the pattern is contacted and adhered to the fruit or vegetable; a user transfers the pattern thereon to the fruit or vegetable by cutting; component 2 is then removed from contact with the fruit or vegetable thereby fixing and revealing only the transferred pattern on the fruit or vegetable. The pattern may be drawn onto component 2 or component 2 may be pre-printed with the pattern.

7 Claims, 5 Drawing Sheets

PRESSURE SENSITIVE COMPOSITE FOR DECORATING SURFACES OF FRUITS AND VEGETABLES AND USE THEREOF

FIELD OF THE INVENTION

The present invention is directed to a product, a method and a kit for decorating a surface. Particularly, the present invention is directed to a method and kit for transferring a pattern onto the surface of fruits and vegetables after which the pattern may be cut to present a decorative appearance.

BACKGROUND OF THE INVENTION

The present invention is directed to the transferring of patterns onto a surface in a new, useful and easy manner. Specifically, the present invention concerns decorating items of produce, such as pumpkins, in order to provide a decorative carving. Of particular concern is providing a product, a method and a kit for decorating pumpkins for Halloween.

Pumpkin carving has long been one of the traditional ways in which Halloween is celebrated. Generally, pumpkin carving involves the removal of a portion of the pumpkin shell surrounding the stem, removal of the seeds and fibers contained in the pumpkin and thereafter carving humorous, grotesque or other decorative features partially or wholly through the pumpkin shell by removing fleshy portions of the shell to obtain the desired appearance. Internal illumination is then provided either by a candle or a battery operated light to result in a glowing decorative pattern.

The intricate carving of pumpkins on a wide scale basis came about in the mid-1980's as a result of the introduction of a pumpkin carving kit. The elements of this kit are set forth in U.S. Pat. No. 4,828,114 entitled Pumpkin Carving Kit issued May 9, 1989 to Bardeen. In the kit described in the '114 patent, elaborate patterns are provided that are transferred onto the surface of a pumpkin by poking small holes through patterns. The patterns are printed onto paper sheets. In order to transfer the pattern to the pumpkin, users must position the paper sheet onto the pumpkin by pushing thumbtacks through the paper then into the shell of the pumpkin. Users then take a sharp plastic tool and push the tool through the pattern on the paper into the shell of the pumpkin. This process results in a series of holes in the shell of the pumpkin that is in the shape of the pattern on the paper. Users then remove the paper sheet and carve the pattern by comparing the holes on the shell with the pattern on the paper sheet. Some of the disadvantages of this system are:

- The paper sheet has a tendency to tear, move and shift as users handle the pumpkin, making the pattern transfer process more difficult and time consuming.
- The process of pushing the sharp pattern making tool through the paper sheet into the shell of the pumpkin is a tedious and time consuming process that is not fun and causes the fingers and hands of the user to get tired.
- Users must look at the obscure patterns of holes formed in the shell of the pumpkin and "match" them with the picture on the paper sheet so the design on the pumpkin can be carved properly.

Another patent that attempts to make the pattern transfer process easier is U.S. Pat. No. 6,093,446 entitled Method for decorating surfaces with transfer patterns issued Jul. 25, 2000 to Bardeen. In the patent, elaborate patterns are transferred onto the surface of a pumpkin by first spreading onto the pumpkin a quantity of a viscous surface preparatory composition. A pattern sheet is provided with the pattern formed thereon in a medium that will transfer onto the surface of the preparatory composition. The preparatory layer is contacted with the pattern sheet and the pattern thereon for a sufficient time to allow the medium to transfer onto the preparatory layer. The preparatory composition is curable to a final state that forms a stable layer adhered to the surface. Some of the disadvantages with this system are:

- Spreading the viscous surface preparatory composition onto the pumpkin then contacting the pattern sheet requires extra time and effort.
- Users must allow time for the pattern on the pattern sheet to transfer to the preparatory layer.
- Users must allow time for the preparatory composition with the pattern to cure onto the pumpkin.

While the pumpkin carving kits and techniques of these references provide alternative solutions to carve pumpkins, there remains a need for a quicker, easier and safer way to transfer patterns and designs onto a pumpkin.

SUMMARY OF THE INVENTION

It is an object of the present invention to provide a new, useful product, method and kit adapted to decorate easily exposed surfaces in general, but specifically the exposed surface on the shell of a fruit or vegetable, such as a pumpkin. Another object of the present invention is to provide a new, useful and easy product, method and kit wherein relatively dramatic designs may be placed on an exposed surface area.

The present invention provides a product, a method and a kit for decorating the surface of fruits and vegetables that have an area for displaying a design. In a preferred embodiment, the product comprises a sheet of materials with two components: component 1 is a sheet of material capable of acting as a release liner for component 2; component 2 is a sheet of material capable of acting as the surface for a pattern formed thereon and capable of adhering to the surface of fruits and vegetables. The method comprises steps in which: component 1 is removed from component 2; component 2 containing the pattern is contacted and adhered to the fruit or vegetable; a user transfers the pattern thereon to the fruit or vegetable by cutting; and component 2 is then removed from contact with the fruit or vegetable thereby fixing and revealing only the transferred pattern onto the fruit or vegetable. The pattern may be drawn onto component 2 or component 2 may be pre-printed with the pattern.

These and other objects of the present invention will become more readily appreciated and understood from a consideration of the following detailed description of the exemplary embodiments when taken together with the accompanying drawings:

DETAILED DESCRIPTION OF THE EXEMPLARY EMBODIMENTS

Figure 1:
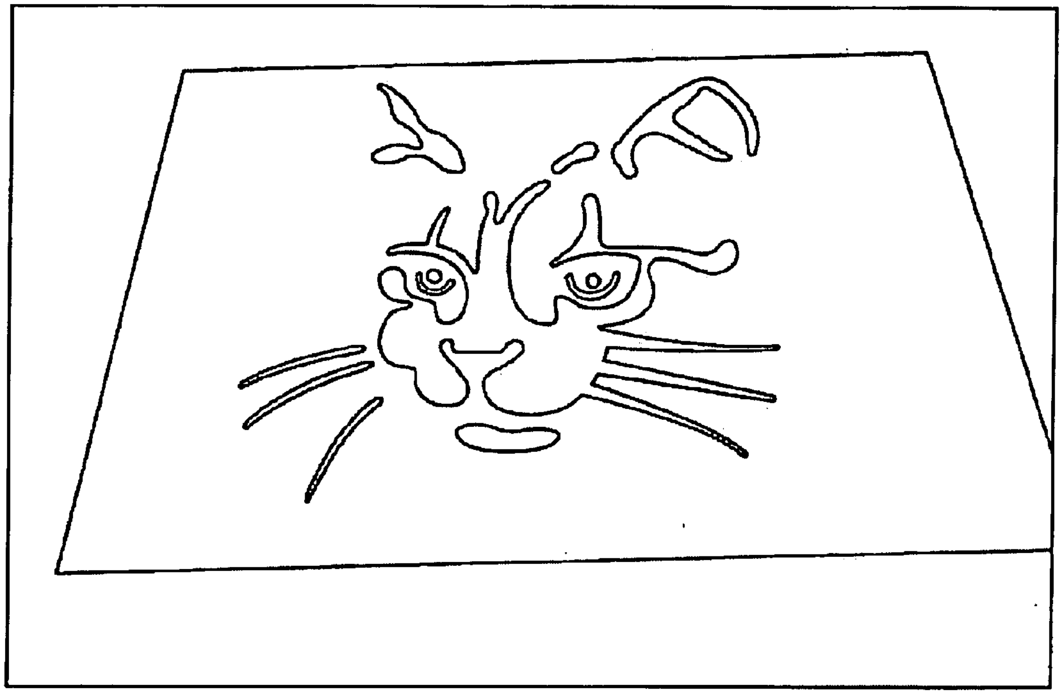
FIG. 1 is a perspective view of a pattern sheet according to the preferred embodiment of the present invention.
Figure 2:
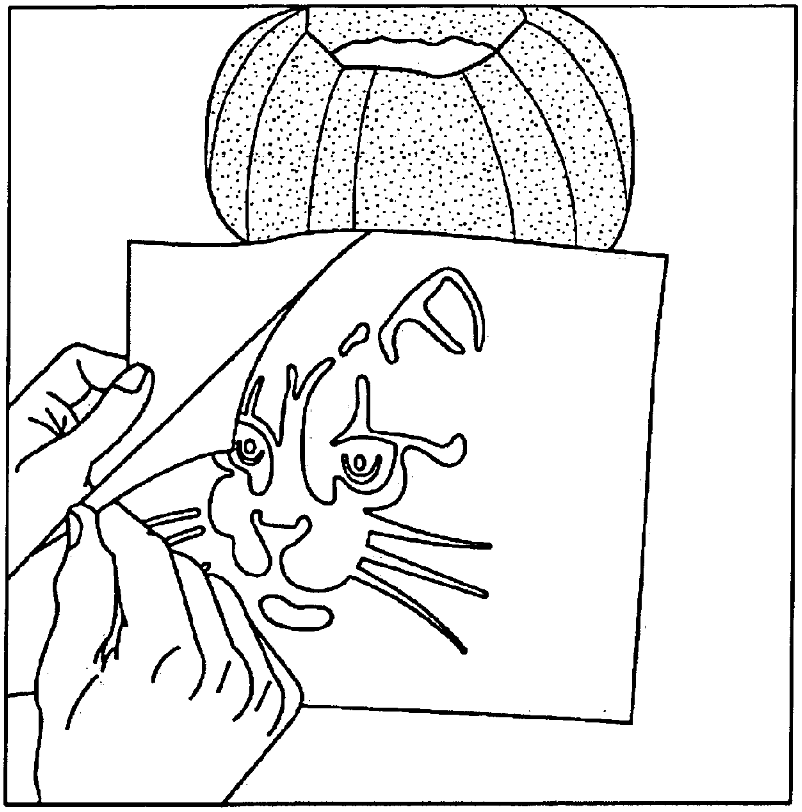
FIG. 2 is a perspective view of the pattern sheet of FIG. 1 partially pulled away from the liner sheet to expose the adhesive layer under the pattern sheet.

The invention comprises a product, a kit containing the product and a method of using the product. The product of the invention, which can be used to decorate the surface of fruits and vegetables, includes at least two components: Component 1 is a sheet of material capable of acting as a release liner for component 2. Component 2 is a sheet of material capable of acting as the surface for a pattern and capable of adhering to the surface of a fruit or vegetable. In combination, at least one surface of component 2 which is adhesive is in contact with said component 1. Component 2 thus has at least one surface which will adhere to fruit and the other surface which bears the pattern or design, to be transferred to the fruit. In a very specific embodiment this product may be sold as a kit, with or without additional items; additional items may include a scoop, carving utensils and knives for carving which may be varied in size.

In a preferred embodiment, properties of component 1 would be a 50# semi-bleached densified kraft liner with specifications as shown below:

| | TARGET | RANGE | TEST |
|---|---|---|---|
| Basis Weight: | 53 lbs.** 86.3/m2 | | TAPPI T-410 |
| Ream Basis: | 24" × 36"- 500 sheets | | |
| Caliper: | 3.2 mils 81.3 | 2.9–3.4 mils 73.7–86.4 | TAPPI T-411 |
| Tensile: | MD: 45 Ibs./in. (7.88 kN/m) | MD: 32 Ibs./in. minimum (5.60 kN/m) | TAPPI T-494 |
| | CD: 211 bs./in. 3.68 kN/m | CD: 15 Ibs./in. minimum 2.Ei3 kN/m | |
| Tear: | MD: 50 grams (490 mN) | MD: 35 grams minimum (343 mN) | TAPPI T-414 |
| | CD: 58 grams 569 mN | CD: 40 grams minimum 392 mN | |
| Opacity: | 70% | 80% maximum | TAPPI T-425 |

Other types of material (such as synthetic material, layers of polyethylene LLDPE, and high density polyethylene) could substitute for the material described above to create component 1.

The pattern sheet (component 2) with the pattern formed thereon would be a 50# EDP smudge resistant medium with specifications as shown below:

| | TARGET | RANGE | TEST |
|---|---|---|---|
| Basis Weight: | 50 Ibs. 74.0/m2 | 48.0–52.0 Ibs. 71.0–77.0/m2 | TAPPI T-410 |
| Ream Basis: | 25" × 38"- 500 sheets | | |
| Caliper: | 3.6 mils 91.0 | 3.4–3.8 mils 86.3–96.5 | TAPPI T-411 |
| Tensile: | MD: 37 Ibs./in. (6.48 kN/m) | MD: 26 Ibs./in. minimum (4.55 kN/m) | TAPPI T-494 |
| | TD: 22 Ibs./in. 3.85 kN/m | TD: 16 Ibs./in. minimum 2.80 kN/m | |
| Tear: | MD: 51 grams (500 mN) | MD: 45 grams minimum (441 mN) | TAPPI T-414 |
| | CD: 51 grams 500 mN | CD: 45 grams minimum 441 mN | |
| Smoothness: (Felt) Sheffield units | 73 | 160 Maximum | TAPPI T-538 |
| Opacity: | 84.5% | 80% Minimum | TAPPI T-425 |
| Brightness: | 87% | 85%–89% | TAPPI T-452 |

Other types of material (such as synthetic material) could substitute for the material described above to create component 2. Component 2 is a sheet of material capable of acting as the surface for a pattern and capable of adhering to the surface of a fruit or vegetable.

Thus one surface of component 2 will bear an adhesive or exhibit a blocking quality whereas the other surface of the sheet material will bear a design. The general purpose permanent adhesive used to adhere the medium onto the surface of a fruit or vegetable enables the medium to be removed from the surface of a fruit or vegetable. The general purpose permanent adhesive is preferably nontoxic to humans. One type of adhesive, designated self-adhesive or self-stick adhesive and used on white labels, is an acrylic emulsion-based permanent adhesive. This type of adhesive is suitable for general purpose adhesion to most paper, bare and painted metal, polypropylene and polyethylene, and generally should not be used on leather, suede, corduroy, velvet, silk, vinyl and plastic. Moisture sensitive adhesives may also be employed; these are sometimes referred to as remoist adhesives. When moisture sensitive adhesives are employed, the liner is not an essential element of the invention; this embodiment is not preferred. When a moisture sensitive adhesive is employed, use of the composite of the invention requires the step of moistening the adhesive. In fact, the exact nature and identity of the adhesive is not per se critical. The clear label products use a solvent based permanent adhesive which is also suitable for general purpose applications.

In the preferred embodiment, the type of adhesive used to affix the pattern sheet onto the surface of a fruit or vegetable would be a tackified general purpose permanent adhesive with excellent adhesion to many substrates with specifications as shown below:

| | |
|---|---|
| ADHESIVE 758: | P758 is a tackified general purpose permanent with great die-cutting and stripping properties. Excellent adhesion to many substrates, especially corrugated. |
| QUICK TACK: | 35 oz./in 2 minimum (0.98 Kg/25 mm) |
| MINIMUM APPLICATION TEMPERATURE: | 40° F. (4° C.) |
| RECOMMENDED SERVICE TEMPERATURE RANGE: | −65° F. to 200° F. (−54° C. to 93° C.) |
| SHELF LIFE: | One year |

90 DEGREE PEEL

| SUBSTRATE | DWELL TIME Lb./in. (Kg/m) Immediate |
|---|---|
| STAINLESS STEEL | 1.4 (25.00) [Paper Tear] |
| POLYETHYLENE | 1.0 (17.86) |
| CORRUGATED | 0.8 (14.29) [Fiber Tear] |

Other types of adhesives could also be used, such as less aggressive, removable grades of adhesive.

This invention was developed by obtaining label material from Green Bay Packaging, Inc. 50# EDP, Green Bay, Wis.

The sample label material was cut down to 8½"×11" size. A pattern was transferred onto the label material by using a standard photocopying machine, resulting in a pattern sheet as shown in FIG. 1. FIG. 1 shows that a pattern sheet is employed and, in this Figure, the pattern sheet is pre-printed with a design. The pattern sheet may include a plurality of cut lines provided at each corner so that the pattern may be severed a portion of the distance of each corner towards the center of the pattern sheet which allows pattern sheet to be placed around the generally spherical contour of the pumpkin to be decorated.

While the present product and method are described with respect to the decorating of fruits (pumpkins, melons, etc.) it is to be understood that, in its broadest form, the present invention could be employed to decorate other surfaces, such as vegetables (squash, gourds, etc.). The scope of this patent is not to be limited by the fact that it is described with respect to the decorating of pumpkins.

The method of the invention comprises providing fruits and vegetables and providing the product comprising component 1 and component 2. Prior to subsequent steps, the pumpkin, or any other vegetable or fruit may be pretreated, e.g. by carving, to remove stem, and seeds, fiber and pulp from the interior of the pumpkin, fruit or vegetable to provide a hollow spherical shell of flesh; however, that is not an essential step in the method of the invention.

Figure 3:
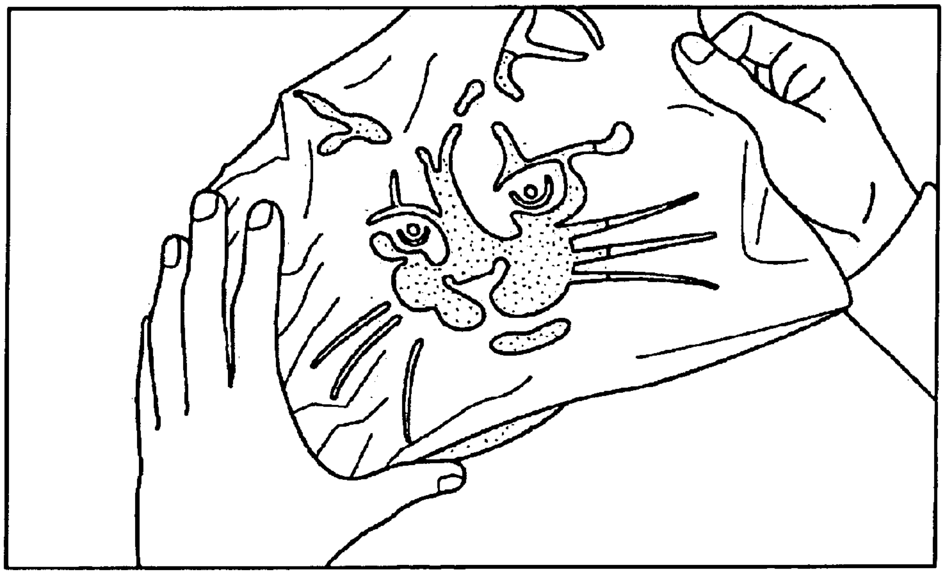
FIG. 3 shows the pattern sheet being placed onto the pumpkin.
Figure 4:
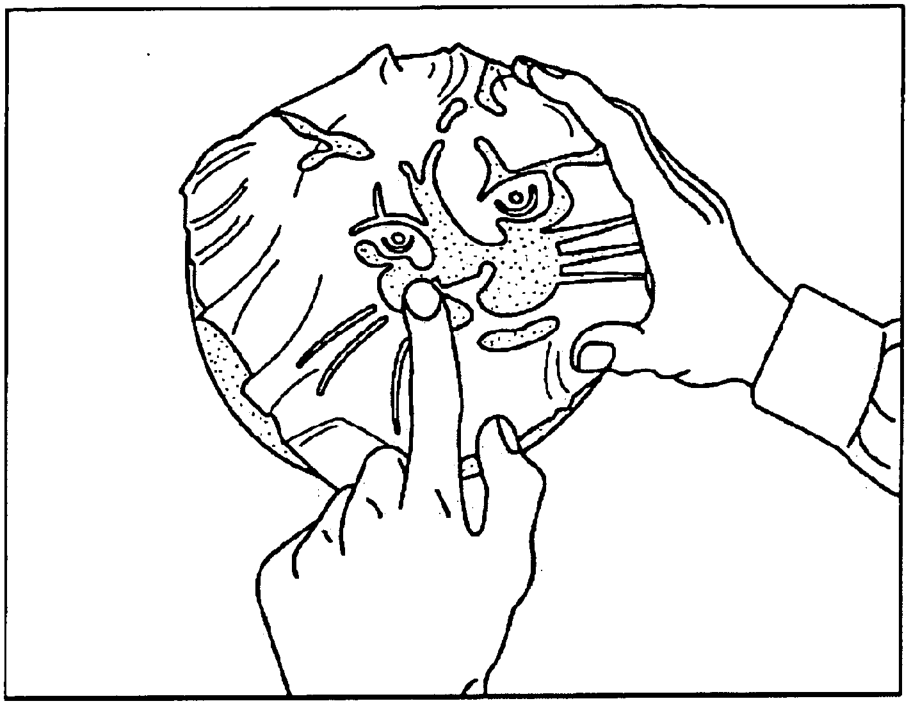
FIG. 4 is a perspective view of the surface in the form of the pumpkin decorated according to the present invention.
Figure 5:
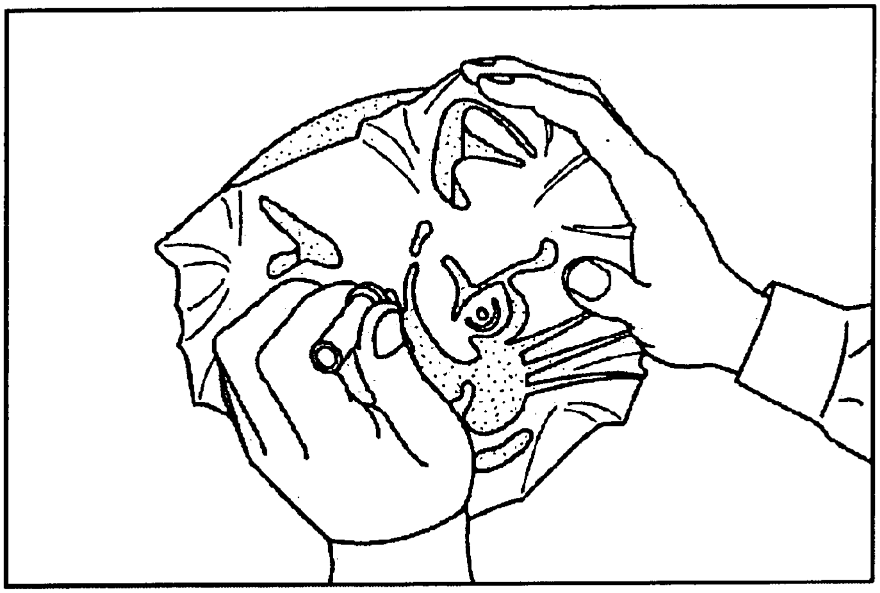
FIG. 5 shows the pattern sheet being carved after having been placed onto the pumpkin.
Figure 6:
FIG. 6 shows the pattern sheet fully carved on the pumpkin.

Use of the product of the invention initially requires stripping component 1 from the at least one adhesive bearing surface of Component 2, that adhesive bearing surface is contacted and adhered to the fruit or vegetable. The pattern or the design thereon is provided on the surface. The pattern may be drawn onto the medium or the medium may be pre-printed with the pattern. The adherence of the pattern sheet is best shown in FIGS. 3 and 4. In FIG. 4, it may be seen that the pattern sheet is being pressed against the pumpkin which is still in the initial state. As is shown in FIG. 4, the design elements of the pattern sheet may be lightly rubbed or smoothed to facilitate the adherence of the pattern sheet onto the surface of the pumpkin.

Carving or cutting or piercing through the lines constituting the pattern or design adhered to the fruit or vegetable provides a cutout in the pumpkin or vegetable flesh; and that cut out corresponds to said pattern or design on component 2.

Figure 7:
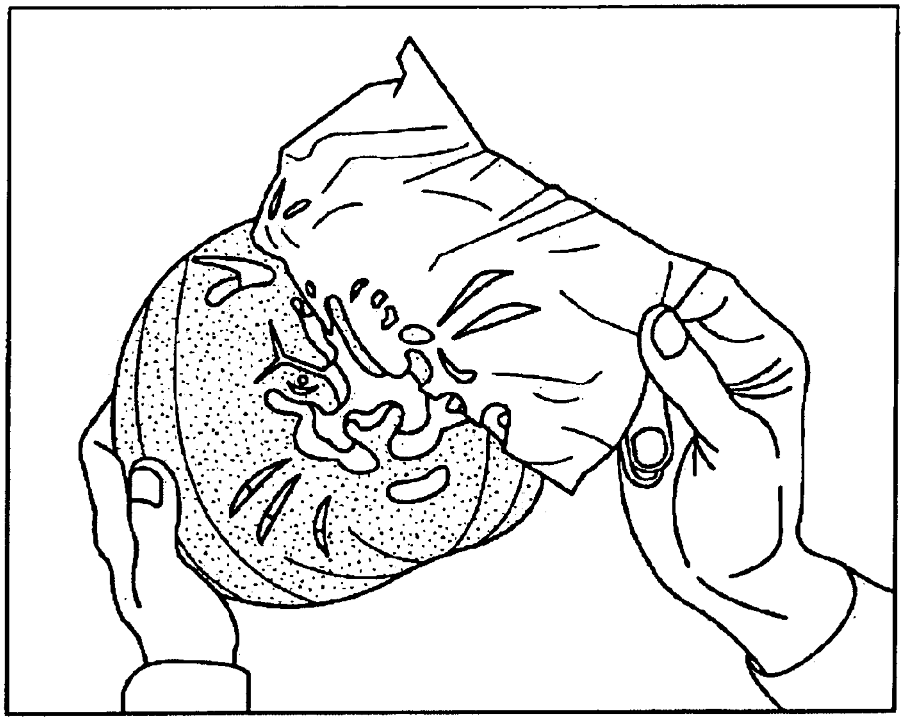
FIG. 7 shows the carved pattern sheet being removed from the carved pumpkin.

The remainder portion of Component 2, after excision of the pattern by carving or cutting, is then removed from contact with the fruit or vegetable thereby fixing and revealing only the cutout transferred pattern onto the fruit or vegetable. FIG. 7, it may be seen that, after the pattern has been carved into the pumpkin, the pattern sheet is peeled off to reveal the carved pumpkin thereunder.

Figure 8:
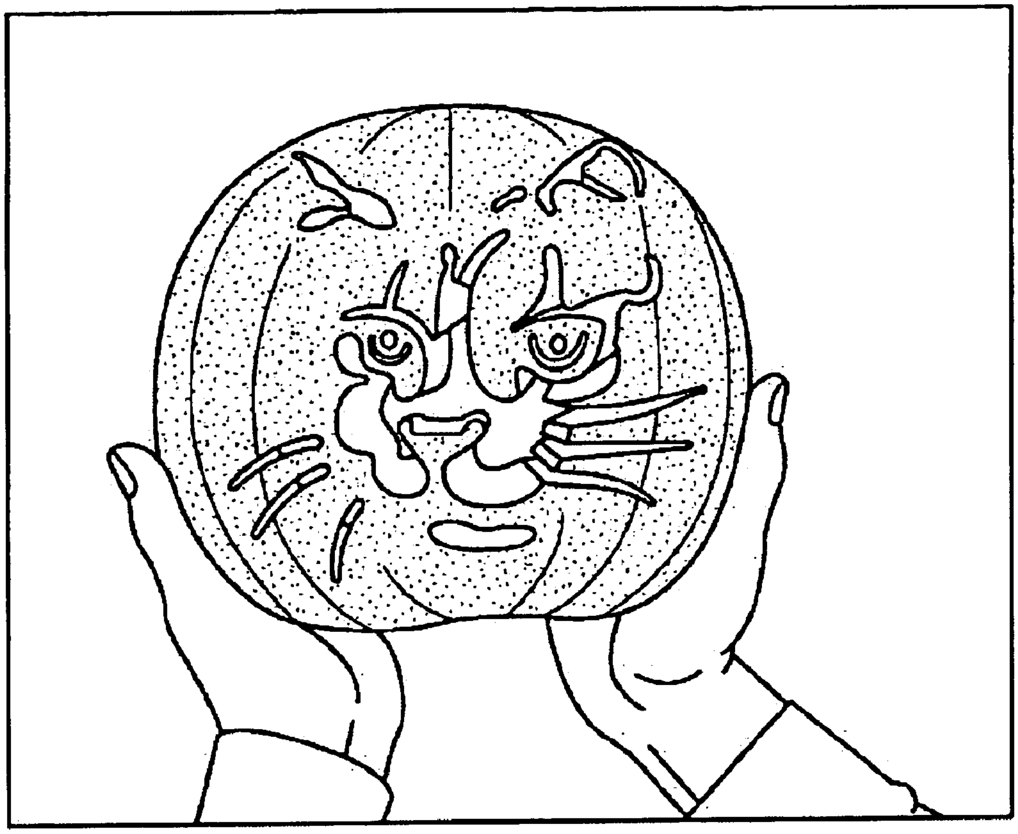
FIG. 8 shows the finished carved pumpkin.

As may be seen in reference to FIG. 8, a decorated product in the form of decorated pumpkin is shown in its completed form. Here, it may be seen that the decorated pumpkin has a design which includes a plurality of design elements, such as a pair of eyes (provided with pupils), nose, and mouth.

Accordingly, the present invention has been described with some degree of particularity directed to the exemplary embodiments of the present invention. It should be appreciated, though, that the present invention is defined by the following claims construed in light of the prior art so that modifications or changes may be made to the preferred exemplary embodiment of the present invention without departing from the inventive concepts contained herein.

What is claimed is:

1. A method of decorating the surface of fruits and vegetables that have an area for displaying a design, comprising the steps of:

a) providing a product for decorating the surface of fruits and vegetables by carving the flesh of said fruits and vegetables, comprising a sheet of material of two components, component 1 and component 2, wherein component 1 is a sheet of material acting as a release liner for component 2; and wherein component 2 is a sheet of paper material having a pattern formed thereon and having a surface which will adhere to the surface of a fruit or vegetable;

b) removing component 1 from component 2;

c) contacting the fruit or vegetable so that component 2 containing the pattern is contacted and adhered to the fruit or vegetable;

d) cutting through the pattern and the flesh of the fruit or vegetable to provide a cutout in the flesh of the fruit or vegetable corresponding to the pattern; and e) thereafter removing the remainder of component 2 from contact with the fruit or vegetable to reveal the cutout corresponding to the pattern and to reveal the surface of the fruit or vegetable.

2. A method according to claim 1, wherein a general purpose permanent adhesive is used to adhere component 2 to the surface of a fruit or vegetable is nontoxic to humans.

3. A method according to claim 2, wherein the general purpose permanent adhesive used to adhere component 2 onto the surface of a fruit or vegetable is a tackified self-adhesive.

4. A method according to claim 2, wherein the adhesive is a self-stick adhesive.

5. A method according to claim 1, wherein said pattern may be drawn onto a surface of component 2 or component 2 is pre-printed with a pattern.

6. The method of claim 1, which comprises cutting the pattern from flesh of the fruit.

7. A method of decorating the surface of fruits and vegetables that have an area for displaying a design, comprising the steps of:

a) providing a product for decorating the surface of fruits and vegetables by carving the flesh of said fruits and vegetables, comprising (a) a sheet of paper material having a pattern formed thereon and (b) having a surface which will adhere to the surface of a fruit or vegetable and having a moisture sensitive adhesive;

b) wetting the moisture sensitive adhesive and contacting it with a surface of the fruit or vegetable;

d) cutting through the pattern and through the flesh of the fruit or vegetable to provide a cutout in the flesh of the fruit or vegetable corresponding to the pattern; and e) thereafter removing the remainder of the sheet of paper material from contact with the fruit or vegetable to reveal the cutout corresponding to the pattern and to reveal the surface of the fruit or vegetable.

* * * * *